United States Patent [19]

Carravetta et al.

[11] 4,284,669
[45] Aug. 18, 1981

[54] METHOD OF MAKING SOLDER COATED TUBES

[75] Inventors: James J. Carravetta, Racine, Wis.; Edward A. Robinson, Bloomington, Ill.

[73] Assignee: Modine Manufacturing Company, Racine, Wis.

[21] Appl. No.: 180,490

[22] Filed: Aug. 22, 1980

Related U.S. Application Data

[62] Division of Ser. No. 73,217, Sep. 7, 1979.

[51] Int. Cl.$^3$ .......................... C23C 1/04; B05C 11/04
[52] U.S. Cl. .................................. 427/357; 427/374.1; 427/374.3; 427/376.8; 427/433; 118/101; 118/125
[58] Field of Search ................ 427/433, 356, 357, 358, 427/284, 367, 277, 374.3, 376.8, 374.1; 264/280, 281, 284; 118/101, 102, 122, 123, 125, 419, 428, DIG. 11, DIG. 18; 164/86, 98

[56] References Cited

U.S. PATENT DOCUMENTS

| | | | |
|---|---|---|---|
| 582,667 | 5/1897 | Murphy | 427/357 |
| 2,994,624 | 8/1961 | Lit et al. | 427/357 |
| 3,140,960 | 7/1964 | Grabczyk et al. | 118/122 |
| 3,579,377 | 5/1971 | Schreiner et al. | 427/357 |
| 3,708,012 | 1/1973 | Zimprich | 165/152 |
| 3,771,595 | 11/1973 | Slaasted | 165/151 |
| 3,920,069 | 11/1975 | Moiser | 165/150 |

*Primary Examiner*—Ralph S. Kendall
*Attorney, Agent, or Firm*—Wegner, Stellman, McCord, Wood & Dalton

[57] ABSTRACT

An apparatus and method for applying a uniform coating of liquid solder to a flat tube particularly at and adjacent to the side edges of the tube. The apparatus has spaced heated platens comprising shaping die members located opposite to each other and including tube embracing recesses forming a slot through which the liquid solder coated tube is passed. The disclosure also includes spacing means for spacing these die members apart a distance equal to the width of the coated tubes and yieldable means such as springs urging the spaced heated platens toward each other to bear against the side edges of the tube together with means for drawing the coated tube between the heated platens and means for heating the platens in the vicinity of the tube to a temperature above the melting point of the solder as well as passages permitting draining of excess solder from the tube during its passage between the heated platens.

5 Claims, 4 Drawing Figures

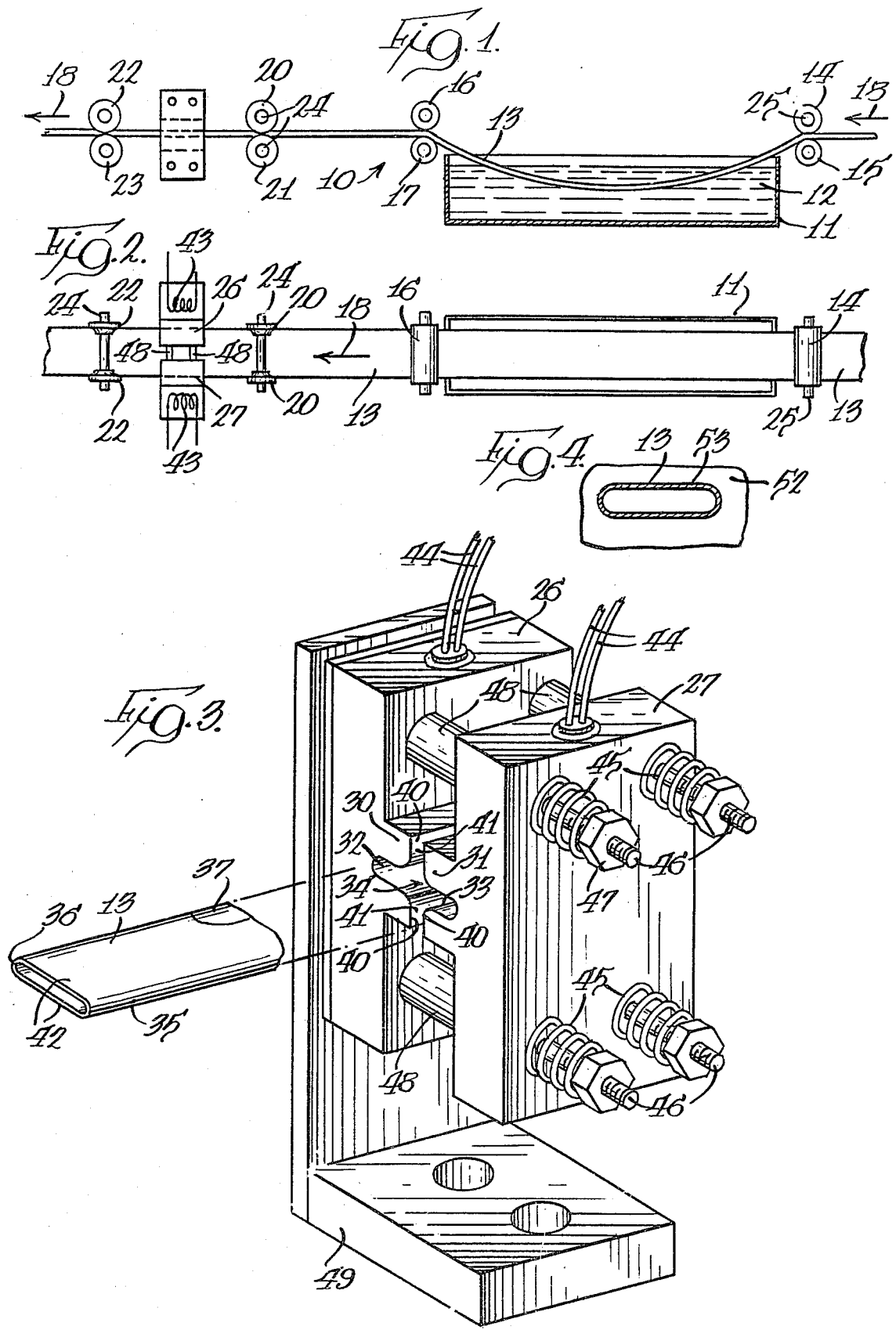

4,284,669

METHOD OF MAKING SOLDER COATED TUBES

This is a division of application Ser. No. 73,217 filed Sept. 7, 1979.

SUMMARY OF THE INVENTION

One of the features of this invention is to provide an apparatus for applying a uniform coating of liquid solder to a flat tube particularly for use in a tube and fin heat exchanger and a method of applying such a uniform coating wherein spaced heated platens are provided comprising opposite shaping die members forming a slot embracing the opposite side edge areas of the tube, means for heating the platens and thus the die members, means for resiliently urging the die members toward each other while drawing the coated tube between the heated platens and means providing spaces between the die members on opposite lateral sides of the coated tube during its passage between the die members.

BRIEF DESCRIPTION OF THE DRAWINGS

FIG. 1 is a side elevational view illustrating semischematically the apparatus and method of the invention.

FIG. 2 is a plan view of the apparatus of FIG. 1.

FIG. 3 is an enlarged perspective view of the heated platens and shaping die members portion of the apparatus and a coated tube emerging therefrom.

FIG. 4 is a fragmentary sectional view through a tube coated with the apparatus and by the method of this invention and associated with a fin in a typical heat exchanger construction.

DESCRIPTION OF THE PREFERRED EMBODIMENT

In the embodiment illustrated in the drawings the apparatus 10 comprises a bath 11 shown schematically for heated liquid solder 12 through which is passed a flat tube 13 of the type illustrated in U.S. Pat. Nos. 3,708,012; 3,771,595 and 3,920,069, all assigned to the assignee hereof. In this application the term solder is used in its broad sense as commonly defined to mean a metal or metallic alloy used when melted to join metallic surfaces.

The tube 13 is guided through the molten bath of solder 12 by drive and guide rollers 14 and 15 at the entrance end of the bath and rollers 16 and 17 at the exit end of the bath. The rollers 14–17 not only draw the tube 13 through the bath 12 in a linear path 18 but also suspend the tube between the two pairs of rollers in a catenary as illustrated in FIG. 1.

In the travel 18 of the tube 13 centering and guide rollers 20 and 21 and 22 and 23 are also provided. These are illustrated in FIGS. 1 and 2 and are provided in pairs above and beneath the path 18 of the tube 13 with each pair being mounted on a driven rotated shaft 24 (the driving means not shown). The driving rollers 14–17 are each mounted on a similar drive shaft 25.

In the path of travel 18 between the rollers 20–21 and 22–23 there is positioned a pair of spaced heated platens 26 and 27 comprising shaping die members 30 and 31 that have confronting surfaces 32 and 33 that together form a slot 34 embracing the opposite side edges 35 and 36 of a tube 13 coated with the solder 12 picked up in the passage 18 of the tube through the bath 11. The coating 37 on the tube 13 is shown schematically in FIG. 3.

In addition to the surface portions 32 and 33 forming the slot 34 the platens 26 and 27 also are provided with spaced surface portions 40 forming air gaps 41 at at least one of the flat sides of the tube 13. As shown in FIG. 3 the illustrated embodiment has an air gap 41 at each of the flat sides 42.

The apparatus also includes means for heating the platens 26 and 27 in the vicinity of the tube 13 during passage of the tube between the platens to a temperature above the melting point of the solder 12. In the illustrated embodiment this heating means comprises electric resistance heaters 43 each supplied with power through electric leads 44 in the customary manner.

As can be seen in FIG. 3 the platens 26 and 27 have smooth confronting surfaces forming the tube slot 34 and a pair of the air gaps 41 adjacent to the opposite surfaces 42 of the tube.

Yieldable means are provided for urging the platens 26 and 27 relatively together to a minimum spacing equivalent to the width of the coated tube between its opposite side edges 35 and 36. As illustrated this yieldable means comprises coil springs 45 each mounted concentrically around a bolt 46 and held in place on the bolt by a nut 47. The springs 45 are arranged in pairs adjacent to the top and bottom of the platen 27 and yieldably urge the platen 27 toward the opposite platen 26.

In order to define this minimum spacing between the platens 26 and 27 spacers or stops 48 are positioned between the platens. These spacers may be in the form of solid cylinders mounted in pairs at the top and bottom of the one platen 26 and against which the springs 45 yieldably force the second platen 27.

The platen 26 and its associated structure including the heating elements 43 and the spacers 48 is conveniently mounted on a bracket 49. The opposite platen 27 is slidably mounted on the bolts 46 which are themselves attached to the other platen 26.

The solder coating 37 is softened and shaped to a uniform thickness by passage through the heated die members 30 and 31. This controlled uniformity not only provides a smooth surface on the outer surface of the coated tube but also produces a coating 37 of uniform dimensions. This makes it easy to press the tube 13 into a core assembly where the fins 52 have fixed and uniform hole sizes 53 for receiving the coated tubes 13 as illustrated in FIG. 4.

This is a very important advantage of the present invention because heretofore soldered coated tubes were found to have coatings of solder of varying thicknesses and usually also had a rough outer surface, both of which made it difficult to assemble the tubes 13 and the fins 52 in a tube and fin heat exchanger.

With the present invention the apparatus and the method causes the solder 37 during its passage through the heated slot 34 to fuse into a smooth and uniform coating. The rollers 14–17 and guide rollers 20–23 keep the tube 13 centered in the controlled temperature wiper slot 34 formed by the confronting recesses 32 and 33 in the platens 26 and 27.

During the manufacture the tube 13 is passed through the molten solder 12 in the bath 11 and then drawn through the shaping slot 34 to provide the uniform solder coating 37 particularly at the lateral edges 35 and 36 of the tube. The contact of the coated tube with the surrounding air serves to cool the molten solder to a solid condition on the outer surface of the tube.

Having described our invention as related to the embodiment shown in the accompanying drawings, it is our intention that the invention be not limited by any of the details of description, unless otherwise specified, but rather be construed broadly within its spirit and scope as set out in the appended claims.

We claim:

1. The method of applying a substantially uniform coating of heated molten solder to the surface of a flat tube at and adjacent to the side edges thereof, comprising: drawing said flat tube through a bath of said molten solder; passing said coated tube between spaced heated platens comprising opposite shaping die members forming a slot embracing the opposite side edge area of said coated tube, said heated die members being at a temperature for maintaining said solder in a molten condition, said die members having means providing a gap in the platens at at least one of the flat sides of the tubes; and means for immediately cooling said coating of solder.

2. The method of claim 1 wherein said platens are yieldably urged relatively together to a minimum spacing equivalent to the width of said coated tube.

3. The method of claim 1 wherein said method comprises heating said opposite die members with an electric heater means for transmitting heat to said solder coated tube during its passage between said platens.

4. The method of claim 1 wherein said method comprises draining solder from the coated tube during its passage between the heated die members through gaps between the die members.

5. The method of claim 1 wherein said platens are yieldably urged relatively together to a minimum spacing equivalent to the width of said coated tube, said method comprises heating said opposite die members with an electric heater means for transmitting heat to said solder coated tube during its passage between said platens, and said method comprises draining solder from the coated tube during its passage between the heated die members through gaps between the die members.

* * * * *